United States Patent
Tamura et al.

(10) Patent No.: US 10,480,930 B2
(45) Date of Patent: Nov. 19, 2019

(54) OPTICAL DISPLACEMENT MEASURING INSTRUMENT, ADJUSTMENT METHOD AND MEASURING METHOD OF OPTICAL DISPLACEMENT MEASURING INSTRUMENT

(71) Applicant: Mitutoyo Corporation, Kawasaki, Kanagawa (JP)

(72) Inventors: Kentaro Tamura, Tokyo (JP); Masaoki Yamagata, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 17 days.

(21) Appl. No.: 15/902,405

(22) Filed: Feb. 22, 2018

(65) Prior Publication Data
US 2018/0259319 A1    Sep. 13, 2018

(30) Foreign Application Priority Data
Mar. 10, 2017  (JP) ................................ 2017-046383

(51) Int. Cl.
*G01B 11/02*   (2006.01)
*G01C 3/00*    (2006.01)

(52) U.S. Cl.
CPC ............. *G01B 11/02* (2013.01); *G01C 3/00* (2013.01)

(58) Field of Classification Search
CPC ....... G01B 11/026; G01B 11/02; G01S 7/497; G01S 7/4972; G01C 3/00

USPC .................................................. 356/601–623
See application file for complete search history.

(56) References Cited

U.S. PATENT DOCUMENTS

| 9,866,747 B2 * | 1/2018 | Satoyoshi .............. G01B 11/24 |
| 2006/0001748 A1 * | 1/2006 | Kamon .............. H04N 5/35509 348/234 |
| 2008/0094643 A1 | 4/2008 | Nishio et al. |

FOREIGN PATENT DOCUMENTS

JP    5154134    2/2013

* cited by examiner

*Primary Examiner* — Hoa Q Pham
(74) *Attorney, Agent, or Firm* — Rankin, Hill & Clark LLP (57) ABSTRACT

Provided is an optical displacement meter capable of enlarging an output signal region with respect to a region in which a light-receiving amount needs to be measured, a method for adjusting an optical displacement meter, and an optical displacement measuring method. The optical displacement meter includes a light-receiving element in which a maximum value of an output signal is set with respect to a boundary value, which is a maximum value of a region in which the light-receiving amount needs to be measured. The entire region of the output signal of the light-receiving element can be assigned to the valid region, in which the light-receiving amount needs to be measured with an optical displacement meter, and the optical displacement meter can have an enlarged output signal region with respect to the region in which the light-receiving amount needs to be measured.

8 Claims, 6 Drawing Sheets

OPTICAL DISPLACEMENT MEASURING INSTRUMENT, ADJUSTMENT METHOD AND MEASURING METHOD OF OPTICAL DISPLACEMENT MEASURING INSTRUMENT

TECHNICAL FIELD

The present invention relates to an optical displacement meter, an optical displacement meter adjustment method, and an optical displacement measurement method.

BACKGROUND ART

Optical displacement meters are used for measuring the displacement, distance, surface shape, and the like for a measurement subject.

When a measurement subject is measured with optical displacement meters, the measurement subject is irradiated with measurement light, reflected light from the measurement subject is received by a light-receiving element, and an output signal from the light-receiving element is processed to calculate an expected numerical value. For example, based on the output signal of the light-receiving element, a change in the light-receiving position of the reflected light received by the light-receiving element can be detected, and the displacement of the measurement subject can be measured.

In optical displacement meters, the light-receiving sensitivity, that is, the relationship of the output signal with respect to the amount of received light, may be problematic.

Figure 5:
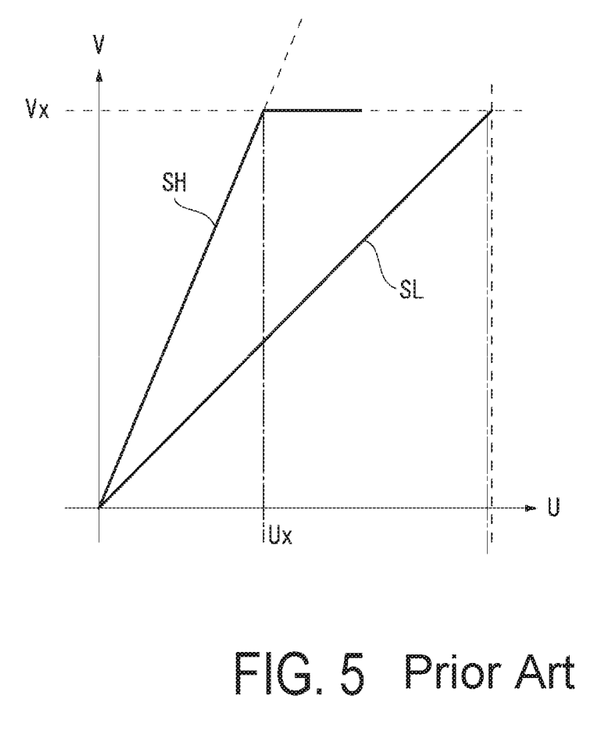
FIG. 5 is a graph showing sensitivity characteristics of a light-receiving element of the related art.

In FIG. 5, for the characteristic SL that has a low light-receiving sensitivity, the change in the output signal V is small with respect to the change in the amount of received light U; that is, since the detection resolution is small, the optical displacement meter cannot detect minute changes.

In contrast, for the characteristic SH that has a high light-receiving sensitivity, the change in the output signal V is large with respect to the change in the amount of received light U, so that the detection resolution can be increased. However, since the maximum value Ux of the amount of received light corresponding to the maximum value Vx of the output signal becomes small, in a case where there is an excessive amount of received light that exceeds this value, the output signal V is saturated at the maximum value Vx, and proper detection cannot be performed.

As an example of a situation in which an excessive amount of received light is obtained, there are cases when a light-receiving element for receiving diffuse reflected light of a measurement subject receives specular reflection light. That is, to detect reflected light from any direction, the optical displacement meter is set to receive the diffuse reflected light of the measurement subject. However, in a case where the measurement subject has a smooth surface, the measurement light is reflected thereon, and is incident on the light-receiving element according to a specific angular condition. Light from specular reflection is significantly stronger than ordinary diffuse reflected light, so that the light-receiving element receives an amount of light several times greater than that of ordinary diffuse reflected light, and the output signal becomes saturated.

To avoid such saturation, optical displacement meters have been proposed in which the light-receiving characteristic of the light-receiving element is adjusted so as to have a high sensitivity in regions where the amount of received light is small (see region A1 and characteristic S1 in FIG. 6), and have a low sensitivity in regions where the amount of received light is large (see region A2 and characteristic S2 in FIG. 6), so that even in cases where an excessive amount of light is received, the output signal will fall within the range of the maximum value of the output signal (see Patent Document 1). Logarithmic curves, quadratic curves, or the like can suitably be used as light-receiving characteristics in which sensitivity is high in regions where the amount of received light is small, and the sensitivity is low in regions where the amount of received light is large.

CITATION LIST

Patent Documents

Patent Document 1: JP 5154134

SUMMARY OF INVENTION

Technical Problem

According to the light-receiving characteristics of the aforementioned Patent Document 1, by setting the sensitivity to be high in regions where the amount of received light is small and the sensitivity to be low in regions where the amount of received light is high while avoiding saturation of the output signal due to excessive amounts of received light, precision in the normal measurement region can be ensured.

However, in Patent Document 1, a partial region of the output signal is also assigned to regions in which an excessive amount of light is received, so that there is a problem in which the assignment of the output signal to the region in which the light-receiving amount needs to be measured is suppressed.

Figure 6:
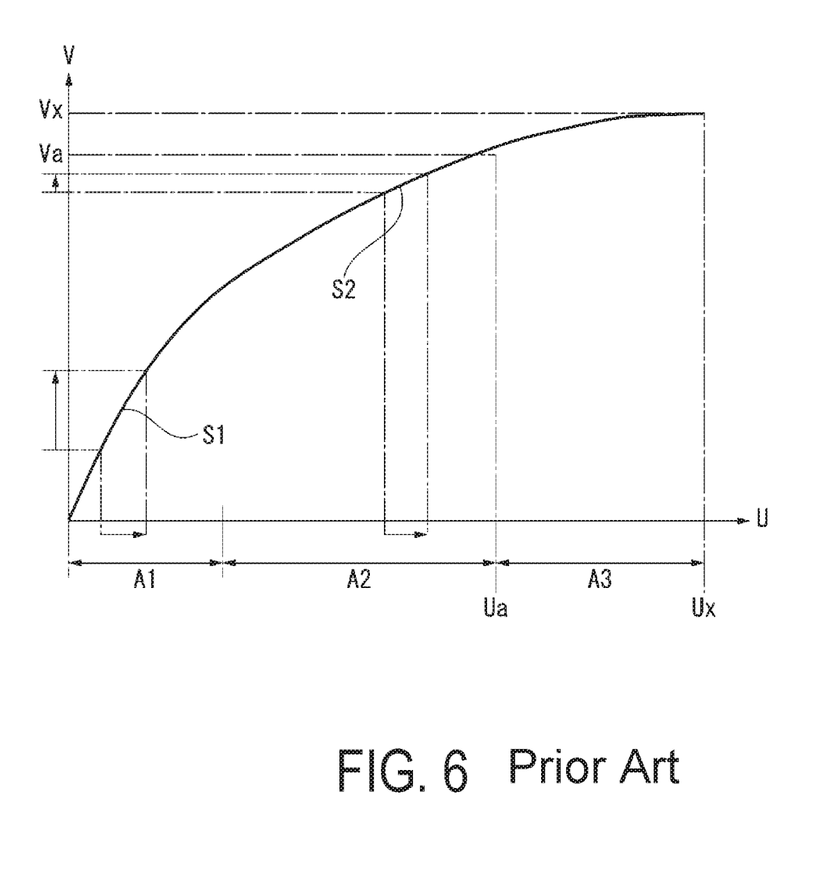
FIG. 6 is a graph showing an adjustment state of sensitivity characteristics of a light-receiving element of the related art.

In FIG. 6, in the optical characteristics of Patent Document 1, in a case where the maximum amount of received light by the light-receiving element is Ux, the maximum value Vx of the output signal is set to correspond to the maximum value Ux of the amount of received light.

Here, in a case where the region in which the light-receiving amount needs to be measured are the region A1 and the region A2, the maximum value thereof is Ua, and a value of the corresponding output signal is Va. That is, the region (Va to Vx) up to the maximum value Vx of the output signal does not correspond to the region in which the light-receiving amount needs to be measured, and there is a problem in which its resolution cannot be increased by using the region, that is, the output signal region cannot be effectively used to a sufficient degree.

An object of the invention is to provide an optical displacement meter capable of enlarging an output signal region with respect to a region in which a light-receiving amount needs to be measured, an optical displacement meter adjustment method, and an optical displacement measuring method.

Solution to Problem

An optical displacement meter of an aspect of the invention includes a light-receiving element in which a maximum output signal is set with respect to a maximum value of a region in which a light-receiving amount needs to be measured.

In an aspect of the invention, the region of the light-receiving amount of the light-receiving element is divided into a valid region (region in which a light-receiving amount needs to be measured) and an invalid region (a region in which an excessive amount of light is received). A displacement measurement process is performed for the light reception in the valid region as a region in which the light-receiving amount needs to be measured. In contrast, the displacement measurement process is not performed for the light reception in invalid regions such as those receiving an excessive amount of received light. In this way, the entire output signal region of the light-receiving element can be assigned to the valid region, which is the region in which the light-receiving amount needs to be measured with the optical displacement meter, and the output signal region can be enlarged with respect to the region in which the light-receiving amount needs to be measured.

In an aspect of the invention, the region in which the light-receiving amount needs to be measured can be suitably selected according to the purpose of using the optical displacement meter, measurement conditions, and the like. Specifically, the region in which the light-receiving amount needs to be measure may be a region excluding regions in which excessive amounts of light are received.

A method for adjusting an optical displacement meter according to an aspect of the invention includes setting a maximum value of a region in which the light-receiving amount needs to be measured as a light-receiving element of the optical displacement meter, and adjusting the light-receiving element so that an output signal is maximized in a case where the light-receiving element receives the maximum value of the region in which the light-receiving amount needs to be measured.

In an aspect of the invention, the effects described with respect to the optical displacement meter of the above-described invention can be obtained.

An optical displacement measurement method of an aspect of the invention relates to an optical displacement measurement method for irradiating a measurement subject with light, receiving reflected light from the measurement subject with a light-receiving element, and processing an output signal from the light-receiving element. The method includes presetting an invalid region in a region where an amount of received light of the light-receiving element is excessive, and assigning an entire output signal region with respect to a remaining valid region. At the time of measurement, processing is performed only for light in the valid region.

In an aspect of the invention, the effects as described for the optical displacement meter of the invention described above can be obtained.

Advantageous Effects of Invention

According to an aspect of the invention, it is possible to provide an optical displacement meter capable of enlarging an output signal region with respect to a region in which a light-receiving amount needs be measured, an optical displacement meter adjustment method, and an optical displacement measurement method.

DESCRIPTION OF EMBODIMENTS

Hereinafter, an embodiment of the invention will be described with reference to the drawings.

Figure 1:
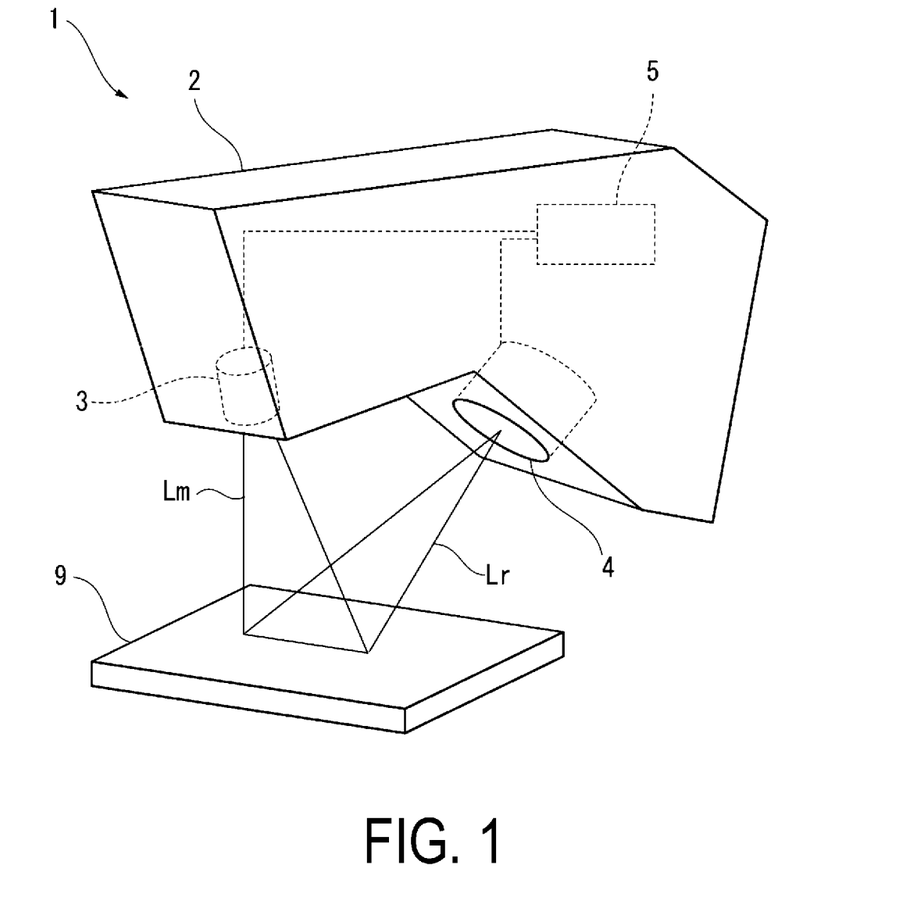
FIG. 1 is a perspective view illustrating an optical displacement meter according to one embodiment of the invention.

In FIG. 1, an optical displacement meter 1 is configured to measure the displacement, distance, and surface shape of a measurement subject 9. A light-emitting element 3 and a light-receiving element 4 are provided in a case 2. These components are arranged such that the measurement subject 9 is irradiated with the measurement light from the light-emitting element 3, and the reflected light reflected by the measurement subject 9 is received by the light-receiving element 4.

The optical displacement meter 1 includes a control device 5. Operation control of the light-emitting element 3 and the light-receiving element 4 and measurement calculations of the optical displacement meter 1 are executed by the control device 5.

Note that an output device for displaying the measurement result and an input device for operating the optical displacement meter 1 are appropriately connected to the control device 5.

Figure 2:
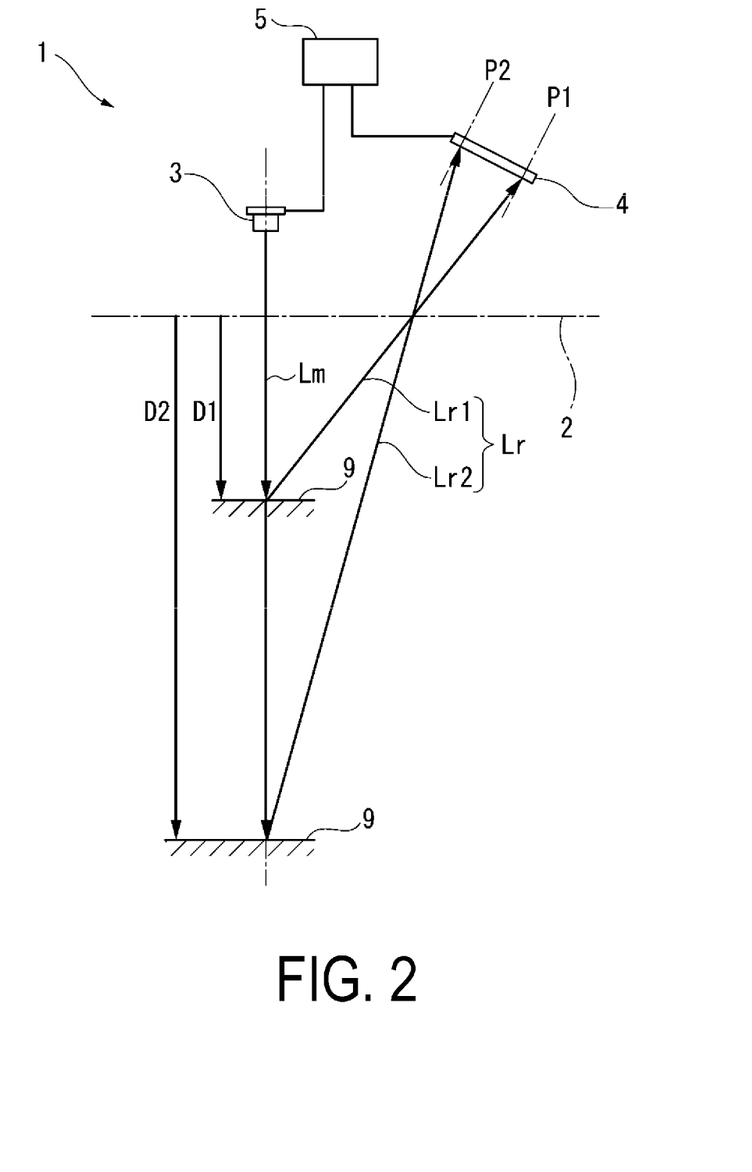
FIG. 2 is a schematic view illustrating a measurement operation of the embodiment.

In the optical displacement meter 1 illustrated in FIG. 2, the measurement light Lm from the light-emitting element 3 is reflected by the measurement subject 9, and the reflected light Lr is received by the light-receiving element 4. The light-receiving position of the light-receiving element 4 varies on the basis of the distance to the measurement subject 9.

For example, when the distance to the measurement subject 9 is D1, the reflected light Lr1 from the measurement subject 9 is received at position P1 of the light-receiving element 4. When the distance to the measurement subject 9 is D2, the reflected light Lr2 from the measurement subject 9 is received at position P2 of the light-receiving element 4.

Accordingly, the control device 5 processes the output signal of the light-receiving element 4 and detect the light-receiving position in the light-receiving element 4. This allows measurement of the displacement (D1-D2) of the measurement subject 9.

Figure 3:
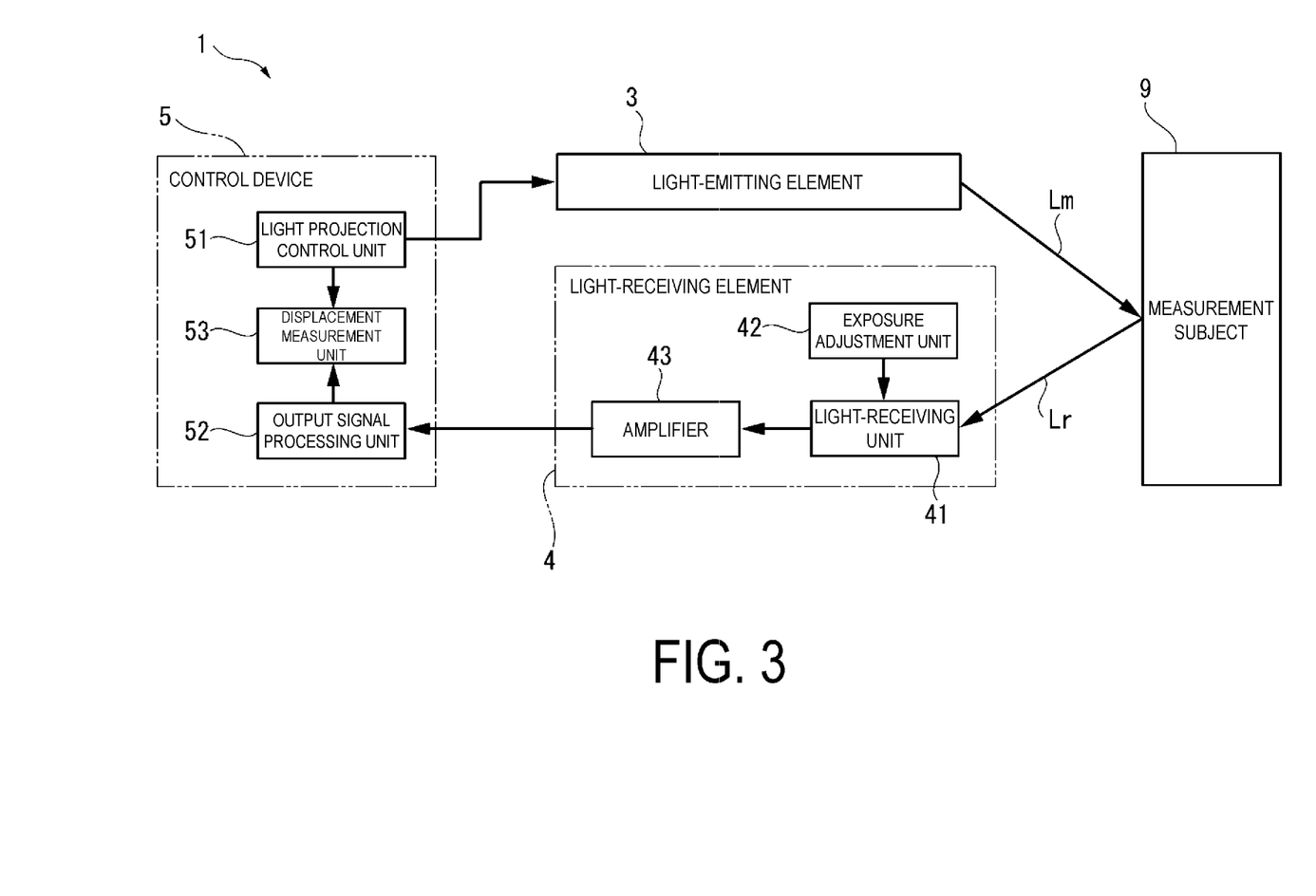
FIG. 3 is a block diagram illustrating measurement elements of the embodiment.

In FIG. 3, as described above, the measurement subject 9 is irradiated with the measurement light Lm from the light-emitting element 3, and the reflected light Lr is received by the light-receiving element 4.

The light receiving element 4 includes a light-receiving unit 41 equipped with a high resolution image sensor, an exposure adjustment unit 42 configured to perform exposure adjustment of the light-receiving unit 41, an amplifier 43 configured to amplify the output signal obtained by the light receiving unit 41 using specified characteristics.

The control device 5 includes a light projection control unit 51 configured to control the irradiation of the measurement light Lm from the light-emitting element 3, an output signal processing unit 52 configured to process the output signal of the light-receiving element 4 based on the reflected light Lr, and a displacement measurement unit 53 configured to measure the displacement of the measurement subject 9 with reference to these outputs.

In the present embodiment, the light-receiving characteristics according to the invention are set in the amplifier 43 of the light-receiving element 4 in order to appropriately execute the measuring operations in the control device 5 and to achieve high precision.

Figure 4:
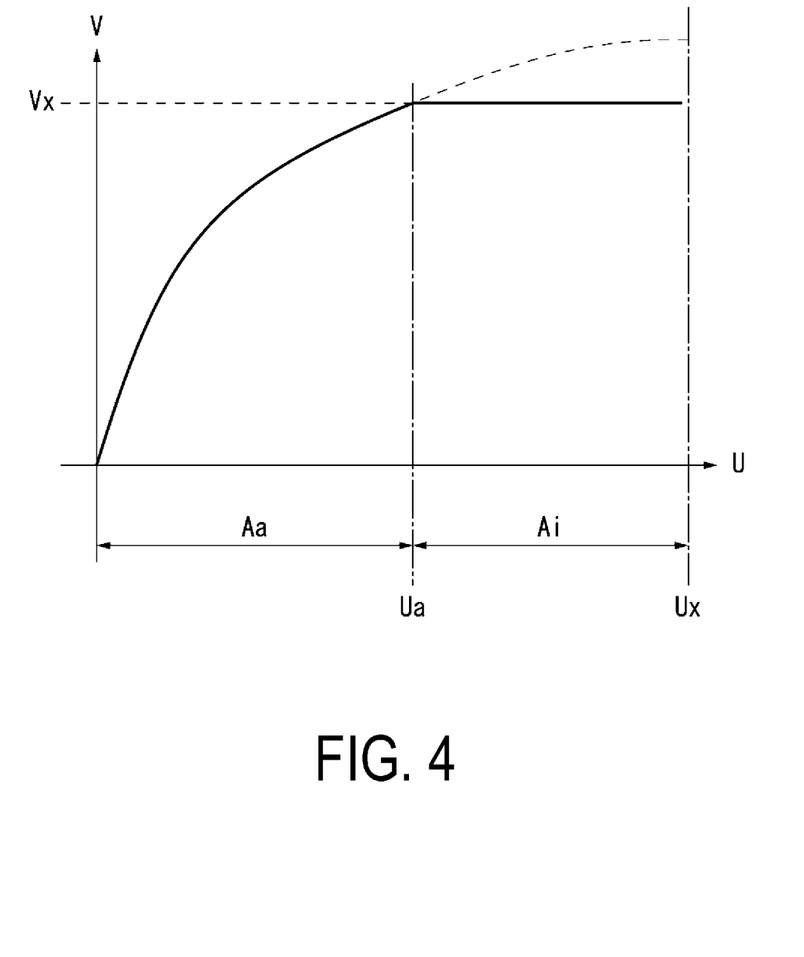
FIG. 4 is a graph showing an adjustment state of the light-receiving element of the embodiment.

In FIG. 4, the light-receiving characteristic of the light-receiving element 4 set in the amplifier 43 is divided into two regions.

The amount of received light U on the horizontal axis takes values from the minimum value 0 to the maximum value Ux. The boundary value Ua is set between the minimum value 0 and the maximum value Ux.

The boundary value Ua is the maximum value of the region in which the light-receiving amount needs to be measured, the region from the minimum value 0 to the boundary value Ua is regarded as the valid region Aa used for the measurement operation, and the region from the boundary value Ua to the maximum value Ux is regarded as the invalid region Ai excluded from the measurement operation.

The boundary value Ua is selected according to the purpose of using the optical displacement meter 1, measurement conditions, characteristics of the measurement subject 9, and the like. Specifically, it is possible to determine a region (invalid region Ai) in which the amount of received light is excessively large for the light-receiving element 4, use the remaining region, that is, the region usable for the measurement operation (valid region Aa), and determine the boundary value Ua as a value to distinguish these areas.

The output signal V on the vertical axis takes values from the minimum value 0 to the maximum value Vx. The maximum value Vx of the output signal has a value corresponding to the boundary value Ua.

With respect to the valid area Aa in which the amount of received light U reaches the boundary value Ua, the output signal V is set such that the light-receiving element 4 has light-receiving characteristics where sensitivity is high in regions where the amount of received light is small using a logarithmic curve, a quadratic curve, or the like, and low in regions where the amount of received light is large.

In the invalid region Ai in which the amount of received light U exceeds the boundary value Ua, the output signal V takes the maximum value Vx which is a constant value. In a case where the characteristic of the valid area Aa continues, the output signal V becomes the state indicated by dotted line in FIG. 4, but since the value of the output signal V exceeds the maximum value Vx, no further value can be taken.

The outer signal processing unit 52 and the displacement measurement unit 53 of the control device 5 are configured not to process the output signal from the light-receiving element 4 for the invalid region Ai in which the amount of received light U exceeds the boundary value Ua, and only process the signal outputted in the valid region Aa which does not exceed Ua. This distinction can be made by determining whether the output signal from the light-receiving element 4 has reached the maximum value Vx of the output signal.

In this embodiment, by setting the boundary value Ua to the amount of received light U of the light receiving element 4, the region of the amount of received light U of the light-receiving element 4 can be divided into the valid region Aa (a region in which the light-receiving amount needs to be measured) and the invalid region Ai (a region in which an excessive amount of light is received).

The displacement measurement process can be performed for the light reception in the valid region Aa as the region in which the light-receiving amount needs to be measured, and the displacement measurement process may not be performed for the light reception in the invalid region Ai in which the amount of received light is excessive.

In this way, the entire region of the output signal V of the light-receiving element 4 can be assigned to the valid region Aa, which is the region in which the light-receiving amount needs to be measured with the optical displacement meter 1, and the optical displacement meter 1 can have an enlarged output signal region with respect to the region in which the light-receiving amount needs to be measured.

INDUSTRIAL APPLICABILITY

The invention relates to an optical displacement meter, a method for adjusting an optical displacement meter, and an optical displacement measuring method, and can be used for measuring a displacement, a distance, a surface shape, and the like for a measurement subject.

REFERENCE SIGNS LIST

1 Optical displacement meter
2 Case
3 Light-emitting element
4 Light-receiving element
41 Light-receiving unit
42 Exposure adjustment unit
43 Amplifier
5 Control device
51 Light projection control unit
52 Output signal processing unit
53 Displacement measurement unit
9 Measurement subject
Aa Valid region
Ai Invalid region
A1, A2, A3 Region
D1, D2 Distance
Lr, Lr1, Lr2 Reflected light
Lm Measurement light
P1, P2 Position
S1, S2, SH, SL Characteristic
U Amount of received light
Ua Boundary value
Ux Maximum value of amount of received light
V Output signal
Vx Maximum value of output signal

The invention claimed is:

1. An optical displacement meter comprising:
   a light-emitting element for irradiating a measurement subject with a measurement light;
   a light-receiving element for receiving a reflected light reflected by the measurement subject; and
   a control device for controlling the light-emitting element and the light-receiving element and for processing an output signal of the light-receiving element to measure a displacement of the measurement subject,
   wherein the control device sets a maximum value of the output signal of the light-receiving element with respect to a maximum value of a region in which a light-receiving amount needs to be measured.

2. The optical displacement meter according to claim 1, wherein the light-receiving element comprises an amplifier configured to amplify the output signal such that the maximum value of the output signal is set with respect to the maximum value of the region in which the light-receiving amount needs to be measured.

3. The optical displacement meter according to claim 1, wherein the control device sets the output signal to be maximized in a case where the light-receiving amount is the maximum within the region in which the light-receiving amount needs to be measured.

4. The optical displacement meter according to claim 1, wherein the control device sets the output signal by using a logarithmic curve or a quadratic curve in which the output signal is maximized in a case where the light-receiving amount is the maximum within the region in which the light-receiving amount needs to be measured.

5. A method for adjusting an optical displacement meter comprising:
   setting a maximum value of a region in which a light-receiving amount needs to be measured as a light-receiving element of the optical displacement meter; and
   adjusting the light-receiving element so that an output signal is maximized in a case where the light-receiving element receives the maximum value of the region in which the light-receiving amount needs to be measured.

6. The method for adjusting an optical displacement meter according to claim 5, wherein the adjusting the light-receiving element comprises amplifying the output signal such that the output signal is maximized in a case where the light-receiving element receives the maximum value of the region in which the light-receiving amount needs to be measured.

7. The method for adjusting an optical displacement meter according to claim 5, wherein the adjusting the light-receiving element comprises setting the output signal to be maximized in a case where the light-receiving amount is the maximum within the region in which the light-receiving amount needs to be measured.

8. The method for adjusting an optical displacement meter according to claim 5, wherein the adjusting the light-receiving element comprises setting the output signal by using a logarithmic curve or a quadratic curve in which the output signal is maximized in a case where the light-receiving amount is the maximum within the region in which the light-receiving amount needs to be measured.

* * * * *